United States Patent
Sorber (10) Patent No.: US 6,240,067 B1
(45) Date of Patent: May 29, 2001

(54) METHOD AND APPARATUS FOR MANAGING CONTROL MESSAGES IN A COMMUNICATION SYSTEM

(75) Inventor: Gordon P. Sorber, Kil (SE)

(73) Assignee: Ericsson Messaging Systems Inc., Woodbury, NY (US)

( * ) Notice: Subject to any disclaimer, the term of this patent is extended or adjusted under 35 U.S.C. 154(b) by 0 days.

(21) Appl. No.: 08/944,765

(22) Filed: Oct. 6, 1997

(51) Int. Cl.[7] .................................................. G01R 31/08
(52) U.S. Cl. ............................................. 370/236; 370/242
(58) Field of Search .................................... 370/216, 235, 370/241, 229, 242, 244, 250, 252, 410, 384, 385, 522, 236; 395/550, 183.02

(56) References Cited

U.S. PATENT DOCUMENTS

| | | |
|---|---|---|
| 5,042,029 | 8/1991 | Hayakawa . |
| 5,193,151 | 3/1993 | Jain . |
| 5,282,203 * | 1/1994 | Oouchi .................................. 370/232 |
| 5,299,194 | 3/1994 | Ichii et al. . |
| 5,353,340 * | 10/1994 | Kunz ........................................ 379/60 |
| 5,367,523 | 11/1994 | Chang et al. . |
| 5,371,731 | 12/1994 | Pratt et al. . |
| 5,473,604 | 12/1995 | Lorenz et al. . |
| 5,493,566 | 2/1996 | Ljungberg et al. . |
| 5,559,999 * | 9/1996 | Maturi .................................. 395/550 |
| 5,600,798 | 2/1997 | Cherukuri et al. . |
| 5,638,360 * | 6/1997 | Sugawara ............................... 370/253 |
| 5,699,519 * | 12/1997 | Shiobara ............................ 395/200.11 |
| 5,774,453 * | 6/1998 | Fukano ................................... 370/231 |
| 5,781,532 * | 7/1998 | Watt ....................................... 370/236 |
| 5,887,127 * | 3/1999 | Saito et al. ......................... 395/182.02 |

\* cited by examiner

Primary Examiner—Chau Nguyen
Assistant Examiner—Alexander Boakye
(74) Attorney, Agent, or Firm—Nixon & Vanderhye P.C.

(57) ABSTRACT

The present invention provides an auto-cancelling buffer and method that ensures that time sensitive control messages such as congestion alarms and recovery messages are efficiently moved between control processes. In a general embodiment, one or more time sensitive control messages are stored in a special buffer. A current control message indicating a first state is compared with a previously buffered control message. If the buffered control message is in a second different state, e.g., opposite the first state, the buffered control message is removed from the buffer, and both messages are discarded. In effect, opposing control messages are cancelled rather than both stored in the buffer. This avoids unnecessary cycling of an end process which acts on control messages forwarded from the buffer. For example, if the control messages include congestion alarm messages and congestion recovery messages, one of the congestion alarm and recovery messages previously stored in the buffer is automatically cancelled when the other message is received. If the compared messages have the same states, only one is stored in the buffer.

33 Claims, 10 Drawing Sheets

METHOD AND APPARATUS FOR MANAGING CONTROL MESSAGES IN A COMMUNICATION SYSTEM

RELATED APPLICATIONS

This application relates to commonly-assigned, co-pending U.S. patent application Ser. No. 08/914,260 entitled "Message Buffering For Prioritized Message Transmission and Congestion Management," and U.S. patent application Ser. No. 08/968,514 entitled "Optimized Memory Management" the disclosure of which is incorporated herein by reference.

FIELD OF THE INVENTION

The present invention relates to managing control messages in a communications system, and more particularly, to a method and apparatus for automatically removing redundant or otherwise unnecessary control messages from a buffer.

BACKGROUND AND SUMMARY OF THE INVENTION

In signaling networks in which messages are transmitted over a communications link between two signaling points, an enormous number of message units must be formatted and transmitted over an appropriate communications path. In an ideal environment, all message units would be transferred immediately to the appropriate destination without error or other impediment. However, in real world data communications, limited communication resources restrict both how much data can be transmitted and the speed of data message unit transmission. Moreover, there are a number of factors that detrimentally impact the accuracy with which messages are communicated. Consequently, message units or entire messages may need to be retransmitted.

One result of these message transmission impediments is that some type of congestion may often occur at one or more points in the message transmission process. Network congestion is generally addressed in various standards, e.g., ANSI, TTC, and ITU-T. In the ITU-T recommendation Q.704, Section 3.8 sets forth criteria for determining signaling link and route congestion status.

Several different approaches exist for managing congestion. U.S. Pat. No. 5,600,798 teaches a data flow control through a frame relay network based on congestion notification. Each station connected to the network includes a station manager that examines congestion notification messages and slows down data traffic destined for congested portions of the frame relay network. U.S. Pat. No. 5,042,029 discloses a congestion and control method in a packet switched communications system. A congestion detector detects any traffic congestion and introduces the delay between receipt of an acknowledgment packet from a destination terminal and transmission of the acknowledgment packet to the source terminal. The amount of delay may be controlled based upon a priority of each acknowledging packet. U.S. Pat. No. 5,193,151 employs a congestion avoidance algorithm where each network node measures a round trip delay from when it sends data to a destination and receives an acknowledgment. Such delays are measured for various traffic load levels. A comparison of these delays is used to determine whether to increase or decrease the load level.

Consider the following example where congestion occurs during communications between first (1) and second (2) nodes connected by a communications link. Specifically, congestion occurs when node (2) fails to acknowledge receipt of messages transmitted by node (1) over the communications link. As a result, new messages presented for transmission from node (1) to node (2) accumulate in one or more transmit buffers in node (1). When the transmit buffer(s) become(s) filled to certain warning levels, congestion alarm signals are generated and sent to the control process(es), e.g., application(s), that generated the original messages to be transmitted. If the congestion condition abates, a congestion recovery message is generated and forwarded to the originating process(es) to restart the stream of messages to be transmitted over the link. This stop-and-go cycling in response to congestion alarm and congestion alarm recovery messages, referred to hereafter as "surging," may itself cause serious message handling problems further exacerbating the congestion problem.

Congestion alarm and congestion alarm recovery messages are typically intermingled with all of the other messages and other types of alarms being provided to end processes/applications at node (1). To process all of these messages in an orderly fashion, a buffer is employed configured in a first-in-first-out (FIFO) format. But in a FIFO format, the congestion related messages receive no special priority in being forwarded to the end process that acts on them. Time delays in such a buffer are particularly problematic for congestion related messages because they are time sensitive. In fact, buffering delays may be sufficiently long that by the time a congestion message actually reaches the end process, the congestion situation may have changed completely, and is therefore the action taken by the end process may be entirely inappropriate.

Thus, there is a need to promptly provide congestion related or other types of time sensitive control messages to higher level processes so that appropriate and timely action can be taken. A related problem to be solved is eliminating unnecessary or excessive stop-and-go cycling in response to buffered control messages. It would also be advantageous to prevent the buffering of redundant or otherwise irrelevant control messages.

It is a general object of the present invention to solve the above-noted problems.

It is an object of the present invention to enable prompt delivery of time sensitive control messages to control processes so that timely and relevant actions can be taken by the control process.

It is an object of the present invention to eliminate control message surging and hysteresis.

It is an object of the present invention to eliminate storage of redundant or otherwise unnecessary control messages awaiting delivery to control processes.

These and other objectives are met and the above-identified problems are solved by the present invention. The present invention provides an auto-cancelling buffer and method that ensures that time sensitive control messages are efficiently moved between control processes. In a general embodiment, one or more control messages are stored in a special buffer set aside for storing, for example, time sensitive control messages. The special buffer ensures priority transmission of the time sensitive information. A current control message is received indicating a first state and is compared with a buffered control message. If the buffered control message is in a second different state, e.g., opposite the first state, the buffered control message is removed from the buffer, and both messages are discarded.

In effect, opposing control messages are cancelled rather than stored in the buffer. This avoids surging, e.g., unnecessary cycling of an end process. For example, if the control messages include congestion alarm messages and congestion recovery messages, one of the congestion alarm and recovery messages previously stored in the buffer is automatically cancelled when the other message is received.

On the other hand, if the states of the buffered and the currently received control messages are the same, one of those messages is stored in the buffer, and the other is discarded. Consequently, redundant control messages are not stored in the buffer. In both instances just described, the number of messages in the buffer is reduced, decreasing the delivery delay for the relevant messages that remain in the buffer.

The method of the present invention may also be applied to situations where congestion alarm messages and congestion recovery messages are assigned to different priority levels. When the buffer stores a congestion alarm message for one of the priority levels, lower levels are assumed to be congested, and higher priority levels are assumed not to be congested. As a result, when a congestion recovery message is received corresponding to the one priority level, congestion alarm messages stored for the one priority level and higher are cancelled. Alternatively, when the buffer stores a congestion recovery message from one of the priority levels and a congestion alarm message is received corresponding to the one priority level, congestion recovery messages stored for the one priority level and lower are cancelled.

In accordance with the present invention, a data transmission interface includes a buffer for storing control messages, and preferably, time sensitive control messages, which can assume either a first or a second state. This control message buffer may be provided in addition to a first-in-first-out (FIFO)-type buffer that stores messages containing different information, e.g., other than time sensitive information. A controller manages control messages received for storage in the buffer. The controller cancels one of the control messages stored in the buffer having a first state when a subsequently received control message is in the second state.

In another embodiment of the present invention applicable to data communications, plural transmit buffers are provided at a transmission node. Each transmit buffer includes a corresponding priority level and stores messages having the corresponding priority level to be transmitted over a transmission link. Congestion control messages relating to a congestion status of each transmit buffer are generated. A congestion message buffer stores the congestion control messages for each transmit buffer. A controller determines the priority level and state of a new congestion message. If the determined state of the new congestion message is different than the state of a congestion message at the same determined level already stored in the congestion message buffer, the controller cancels the already stored congestion message.

When the congestion message buffer stores a congestion alarm message for one of the priority levels, lower priority levels are assumed to be congested, and higher priority levels are assumed to be not congested. When a congestion recovery message is received corresponding to the one priority level, the controller cancels congestion alarm messages stored for the one priority level and higher. When a congestion alarm message is received corresponding to one priority level, the controller cancels congestion recovery messages stored for the one priority level and lower.

These features and advantages as well as others of the present invention will be described in further detail in conjunction with the drawings below.

DETAILED DESCRIPTION OF THE INVENTION

In the following description, for purposes of explanation and not limitation, specific details are set forth such as specific signaling systems, hardware configurations, data structures, data flows, interfaces, techniques, etc. in order to provide a thorough understanding of the present invention. However, it will be apparent to one skilled in the art that the present invention may be practiced in other embodiments that depart from these specific details. For example, while the detailed example embodiment is disclosed in the context of Signaling System Number 7, e.g., at a transmission interface between particular SS7 protocol layers, the present invention may be used in many other communication and computer applications. For example, the present invention may be advantageously applied in TCP/IP-Internet applications, asynchronous transfer mode (ATM) signaling, mobile ISDN and other digital telephony and satellite communications, etc. In other instances, detailed descriptions of well-known methods, protocols, and data processing devices are omitted so as not to obscure the description of the present invention with unnecessary detail.

Figure 1:
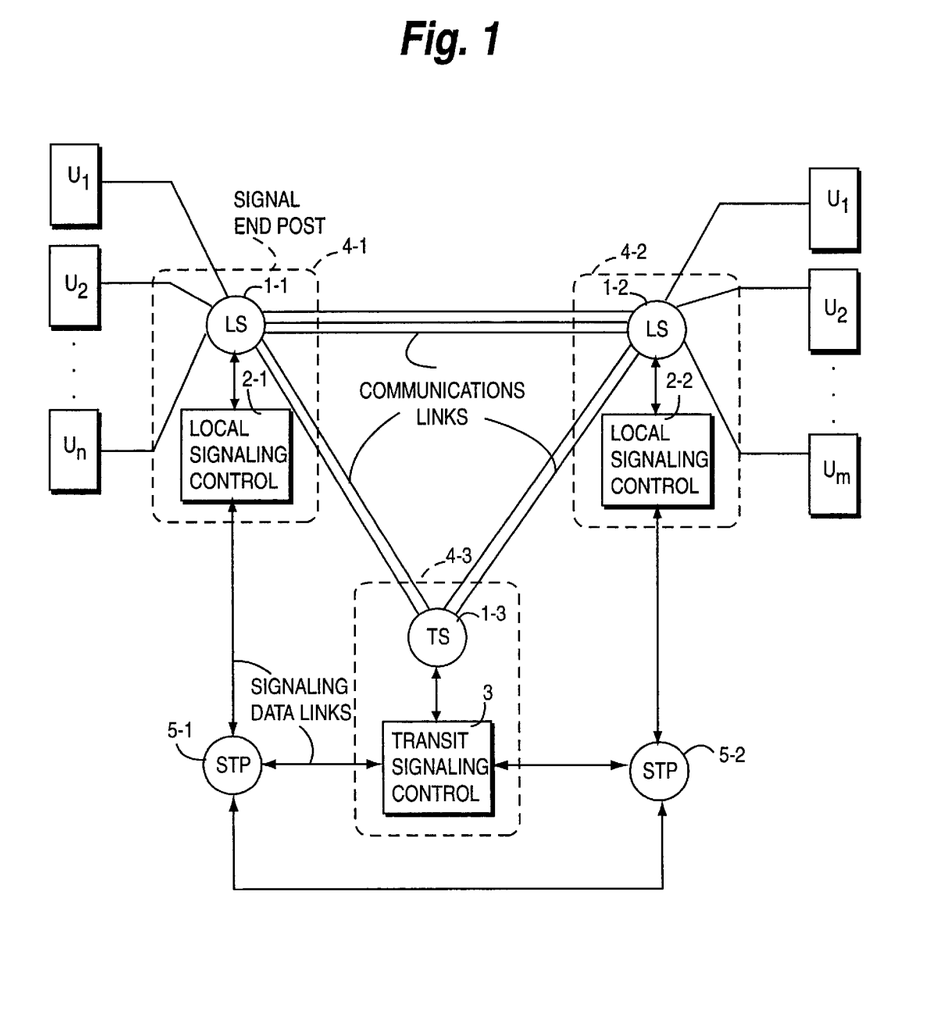
FIG. 1 is block diagram of a communications network including a signaling network in which the present invention may be employed.

FIG. 1 shows a communication network example in which the present invention may be advantageously applied. For simplicity, the network comprises local switches (LSs) 1-1 and 1-2 for serving user terminals $U_i$ and a transit switch (TS) 1-3. Switches 1-1, 1-2, and 1-3 may be circuit-switched or packet-switched systems interconnected by communication links to form, for example, an information network for carrying voice, data, video, facsimile, and control signals. Each of the switches is associated with a signaling controller with local signaling controllers 2-1 and 2-2 and transit signaling controller 3 associated with switches 1-1, 1-2, and 1-3, respectively, to form signal end points 4-1, 4-2, and 4-3. The signaling controllers may be interconnected by signaling data links via signal transfer points (STPs) 5-1 and 5-2 to form a signaling network in order for signaling messages to be transmitted from an originating signal end point to a destination signal end point according to CCITT (now ITU-T) recommendations. Specific reference is made to ITU-T Q-series recommendations, e.g., Q.701 to Q.706, inclusive and Q.710, which generally describe Layers 1 and 2 (and Layer 3) of the Message Transfer Part. However, this buffering scheme is applicable to other SS7 stack bases, e.g., with SCCP or LAPD, LAPF, etc.

Figure 2:
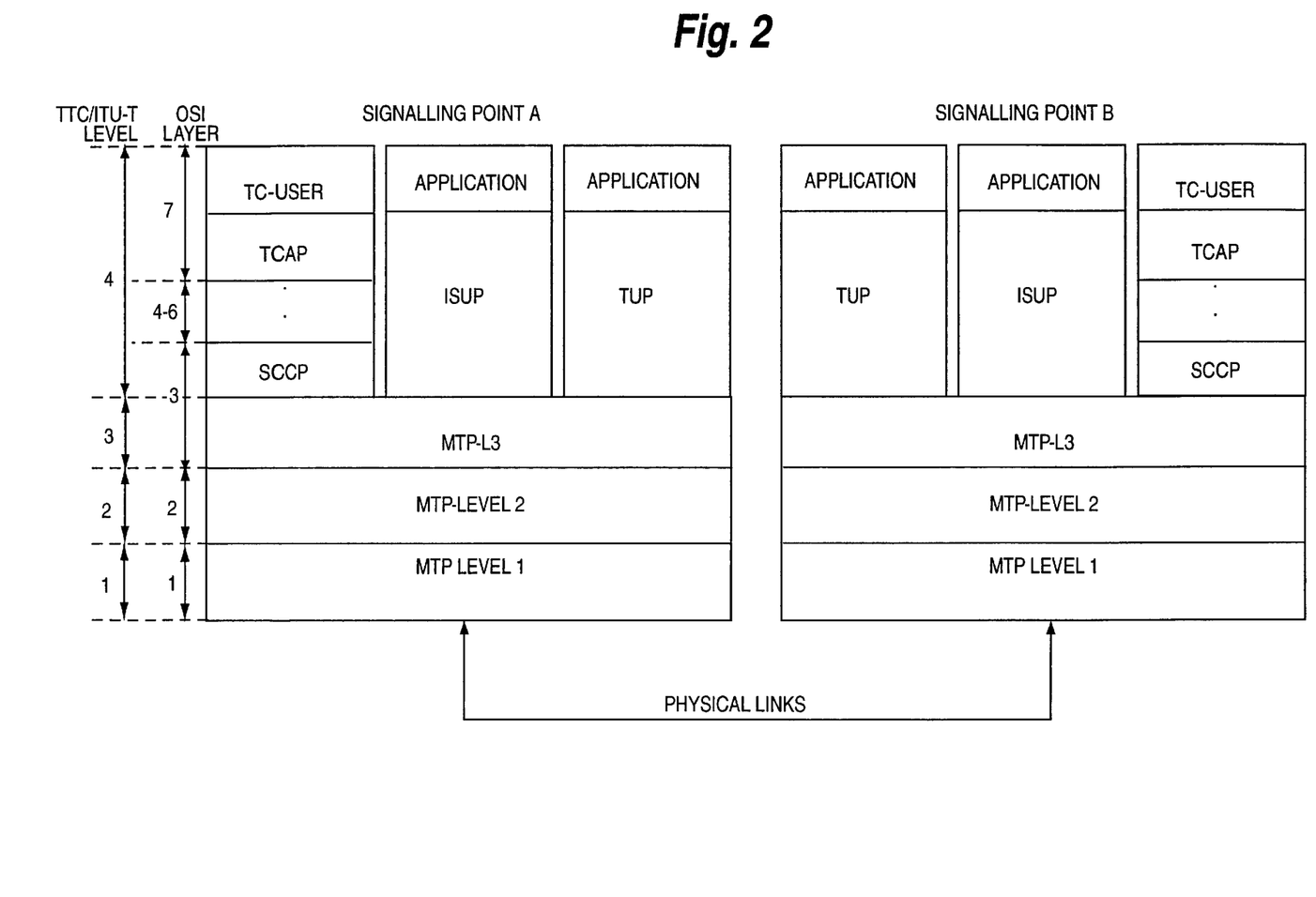
FIG. 2 is a diagram illustrating various levels or layers of different communication protocol models.

FIG. 2 shows a model of the Signaling System Number 7 functional levels sometimes referred to as ANSI/TTC levels alongside of the traditional OSI, seven-layer protocol model. In general, OSI layers 1–3 comprise functions for the transportation of information from one location to another possibly by way of a number of communication links in tandem. The message transfer part (MTP) and the signaling connection control part (SCCP) of Signaling System Number 7 are an example of SS7 modules which perform the OSI layer services 1–3.

OSI layers 4–7 define functions relating to end-to-end communication. These layers are independent of the internal structure of the communications network. Transaction capabilities (TC) and/or User Parts (UP) provide OSI layer 4–7 services. OSI layer 7 represents the semantics of a communication, and OSI layers 1–6 are the means by which the communication is realized. Application entities provide application layer protocols in OSI layer number 7.

Since Signaling System Number 7 is used to transmit information between different users, for example telephony users or integrated services digital network (ISDN) users, its functions are divided into a number of "user" parts (UP) as shown in FIG. 2. TCAP stands for transaction capabilities application part, ISUP for ISDN user part, and TUP for telephony user part, among many others. The user parts process signal information before and after transmission to the signaling network. The message transfer part (MTP) reliably transports and delivers user part information across the Signaling System Number 7 network. The MTP also reacts to system and network failures that affect the information from the user parts and takes the necessary action to ensure that the information is safely conveyed.

As shown in FIG. 2, the MTP is divided into three functional levels L1, L2, and L3. The MPT-L1 defines the physical, electrical, and functional characteristics of a signaling data link and the means to access it. The signaling link is sometimes referred to as a "bearer" and is a bidirectional transmission path for signaling messages between two signaling points, which traditionally consisted of copper wires but which are increasingly made up of glass-fiber, microwave, or satellite links. The common denominator is the transfer of information in the form of binary codes, i.e., as a sequence of states indicating zeros and ones. The MTP-L2 defines the functions and procedures for and relating to the transfer of signaling messages over one individual signaling link, including various ancillary functions, such as error detection, framing, bit-stuffing, etc. The MTP-L3 handles signaling network functions including message routing, discrimination, and distribution as well as signaling network management functions.

In general, a signaling message is transferred over the signaling link in the form of signal units. In the basic SS7 model, there are three types of signaling units differentiated by means of a length indicator. For information generated by a user part, a message signal unit (MSU) is used. The MSU carries the signal information between user parts, as the MSU is passed from SS7 module to module, down through the MTP layers to the link and to the next node, where it follows the same path up through the MTP layers and is finally delivered to the opposite user part. If an error is detected in the MSU at the receiving MTP-L2, reception is not acknowledged, and the MSU will be retransmitted. For control information to be exchanged by MTP-L2, link status signal units (LSSU) and fill in signal units (FISU) are used. The LSSU is used for starting up a signaling link and when there are errors in the link. The FISU is used to keep the link running when there are no MSUs to be sent. All three of these signals will contain parameters used to acknowledge (ACK) or reject (NACK) MSU signals at the transmitting MTP-L2 when a received MSU is found to be correct or in error when examined at the opposite MTP-L2.

Each local signaling controller includes data processing hardware and software for generating and formatting messages down the protocol stack for transmission on a link and up the protocol stack for delivery to an end application. For example, the local signaling controller hardware may include a SUN workstation that employs multiple processors connected via appropriate buses to random access memory (RAM), read-only memory (ROM), and magnetic storage media. The RAM main memory is used for storing temporary variables or other intermediate information during execution of instructions by the processors. ROM and/or other static storage devices store static information and instructions for the processor. The magnetic storage media may also store information instruction as well as various files.

Figure 3:
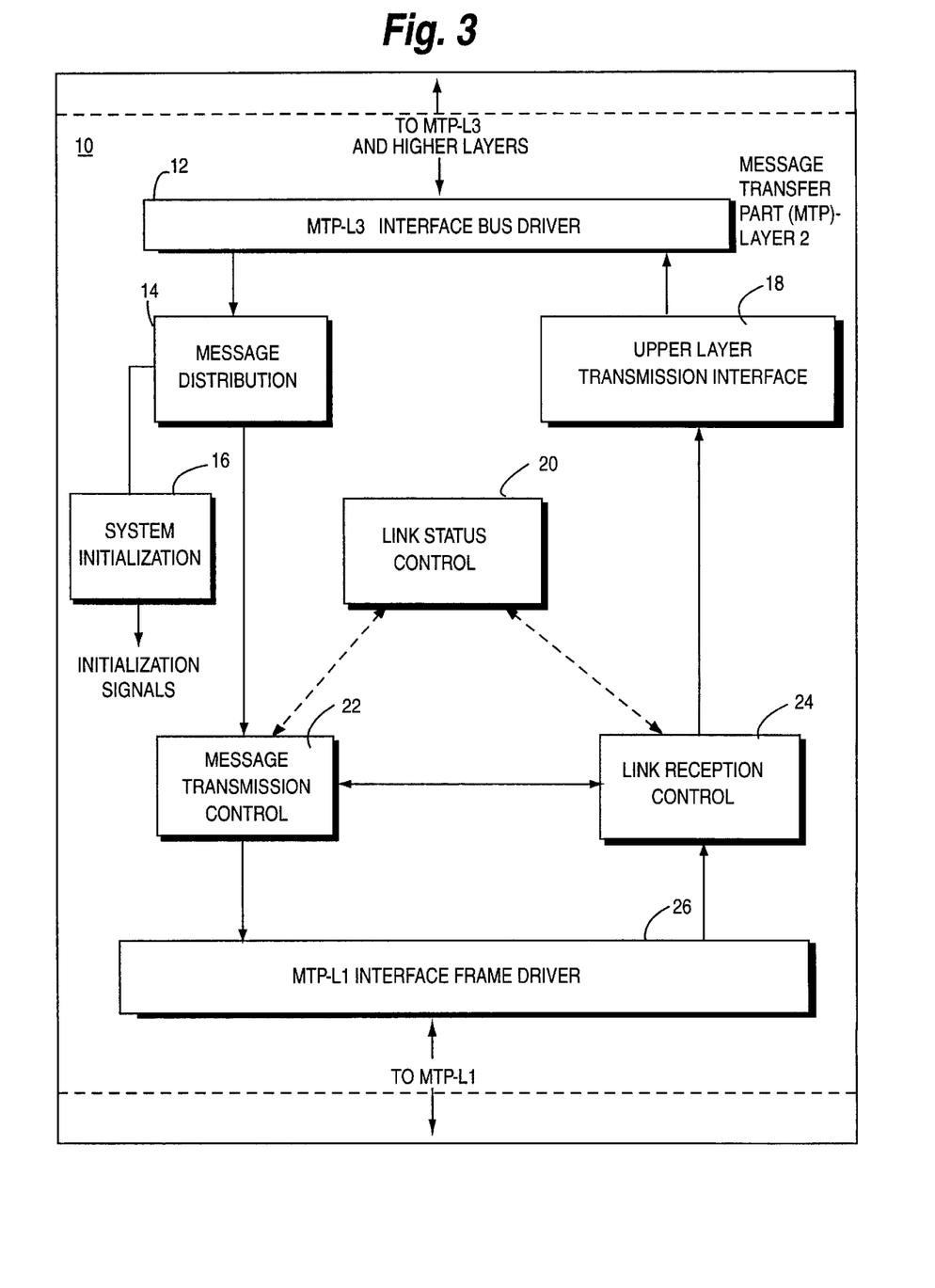
FIG. 3 is a function block diagram illustrating various processes implemented at MTP-L2 in accordance with an example embodiment of the present invention.

FIG. 3 shows a portion of the software functions implemented at each local signaling controller, and in particular, MTP-L2 software processes. Software process 12 is an MTP-3 interface bus driver that interfaces MTP-L2 and MTP-L3 communications. The MTP-L3 interface bus driver handles the transfer of all signals from MTP-L3 to message distribution process 14 and from the upper layer transmission interface process 18 to MTP-L3. Similarly, software process 26 is an MTP-L1 interface frame driver that interfaces communications between MTP layers 2 and 1, while using large scale integration (LSI) circuit chips to perform framing, cyclic redundancy check (CRC) error tests, bit-stuffing functions, or other necessary link-related functions which are not relevant to understanding this invention. The MTP-L 1 interface frame driver 26 transparently handles the transfer of all signals from the message transmission controller 22 to the communications link hardware and from the communications link hardware to the link reception control process 24.

The message distribution process 14 handles all signals received from MTP-L3 via the MTP-L3 interface bus driver 12 and distributes received signals to destination processes in MTP-L2. At system start up, a system initialization process 16 generates initialization signals to configure and start the various MTP-L2 software processes. The upper layer transmission interface software process 18 handles transmission of all signals to the MTP-L3 bus driver interface and higher layers. In systems where the MTP-L2 functions are integrated with the higher levels so that there is no bus, this process may be omitted.

The link reception control software process 24 controls reception of all signal units from the communications link via the interface frame driver software process interface to MTP-L1 26. Incoming message units are processed sequentially without priority sorting. The sequential handling of incoming messages assumes that the priority of delivery of those incoming message units was established by the sending signaling node. Message units from the communications link's reception control process 24 are forwarded to the upper layer transmission layer interface 18 for delivery up the protocol stack. A link status control software process 20 monitors the status of the signaling link between node 10 and other nodes and performs a variety of functions, e.g., initial alignment control (IAC).

The message transmission control software process 22 controls the transmission of message units on the signaling link. Message transmission control software process 22 includes one or more transmit buffers (TB). Plural transmit buffers may be used with each priority transmit buffer corresponding to one priority level. Message transmission control 22 also includes a "retransmit" buffer (RTB).

Figure 4:
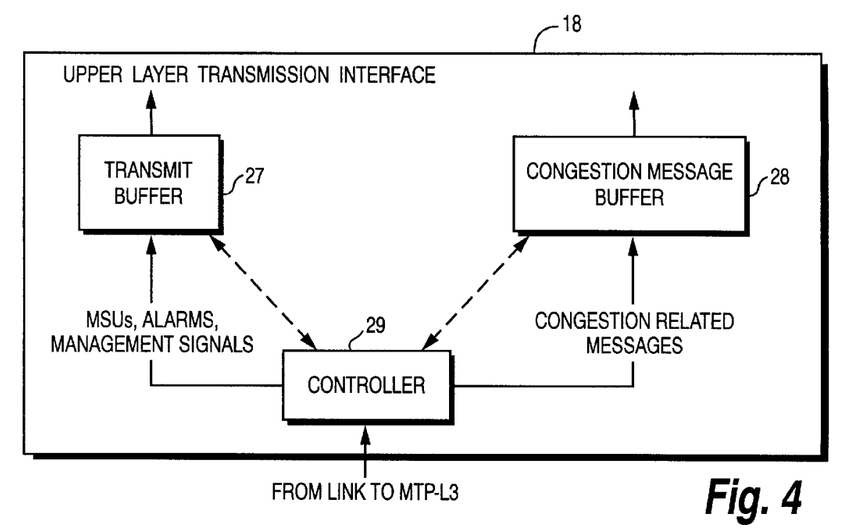
FIG. 4 is a more detailed block diagram illustrating the upper layer transmission interface block of FIG. 3.

FIG. 4 shows a more detailed block diagram of the upper layer transmission interface 18 where the present invention finds advantageous example application. Upper layer transmission interface 18 includes a transmit buffer 27, a special congestion message buffer 28, and a controller 29. The transmit buffer may be a first-in-first-out (FIFO)-type buffer where incoming MSU messages and possibly management signals, alarms, reports, and statistic signals are stored while awaiting transfer to MTP-L3 and/or a management process. The congestion message buffer 28 is an auto-cancelling buffer dimensioned according to the number of priorities defined for a system. Outgoing congestion messages relating to one or more transmit buffers are reported from the message transmission control 22 through link reception control 24 and upper layer transmission interface 18 up to MTP-L3.

Rather than intermingling congestion-related messages with the other types of messages stored in the transmit buffer 27 which results in substantial delivery delays, the controller 29 in the upper layer transmission interface 18 analyzes messages coming up from the link being forwarded to MTP-L3 and selectively routes MSUs, alarms, and management signals to the transmit buffer step 27 and congestion related messages to the congestion message buffer 28. As a result, congestion messages and alarms stored in buffer 28 are given priority over less time sensitive messages stored in transmit buffer 27. Accordingly, when the controller 29 receives messages to be sent from the upper layer transmission interface to MTP-L3, the controller 29 first inspects the congestion message buffer 28. If there is a congestion message stored in the buffer, that congestion message is given priority and forwarded to MTP-L3 before messages from the MSU transmit buffer 27 are sequentially transmitted to MTP-L3.

The detailed description of the example embodiments of the invention is presented in a data communications environment with the control messages being congestion-related messages such as a congestion alarm message and a congestion recovery message. The present invention, however, is not limited to a particular type of control message or environment. Indeed, the present invention may be advantageously applied to any situation where control messages, and in particular time sensitive messages, are passed between two processes. As noted above, the present invention may be advantageously applied for example in TCP/IP-Internet applications, asynchronous transfer mode (ATM) signaling, mobile, ISDN and other digital telephony and satellite communications, etc.

The present invention therefore ensures that congestion and other time sensitive control messages receive priority over less time sensitive messages and are quickly and efficiently routed to upper layer control processes. The present invention also ensures that unnecessary and redundant control messages are not maintained in the congestion message buffer 28 or sent up to higher layer processes.

A simple example of the invention is an application having one control signal of concern which toggles between two states. In the context of managing congestion related messages, such a control signal might correspond to a congestion control signal for a single transmission buffer in message transmission control 22. The congestion control signal toggles between two states: congested and recovered.

In that application, the auto-cancelling congestion message buffer 28 is used as follows. If a congestion alarm signal is received by controller 29, it inspects the congestion message buffer 28. If the buffer 28 is empty, the congestion alarm is inserted. The next congestion message received by controller message should be a congestion recovery message. When the recovery alarm arrives, the congestion message buffer 28 may be empty because the previous congestion alarm has already been sent up to MTP-L3. In that case, the congestion recovery alarm is stored in buffer 28. However, if the congestion alarm is still stored in buffer 28, the congestion alarm and congestion recovery messages are cancelled and discarded by the controller 29. This avoids the surging problems noted in the background where congestion messages switch from congested-to-recovered to congested and so on rapidly filling up the buffer 28.

Figure 5:
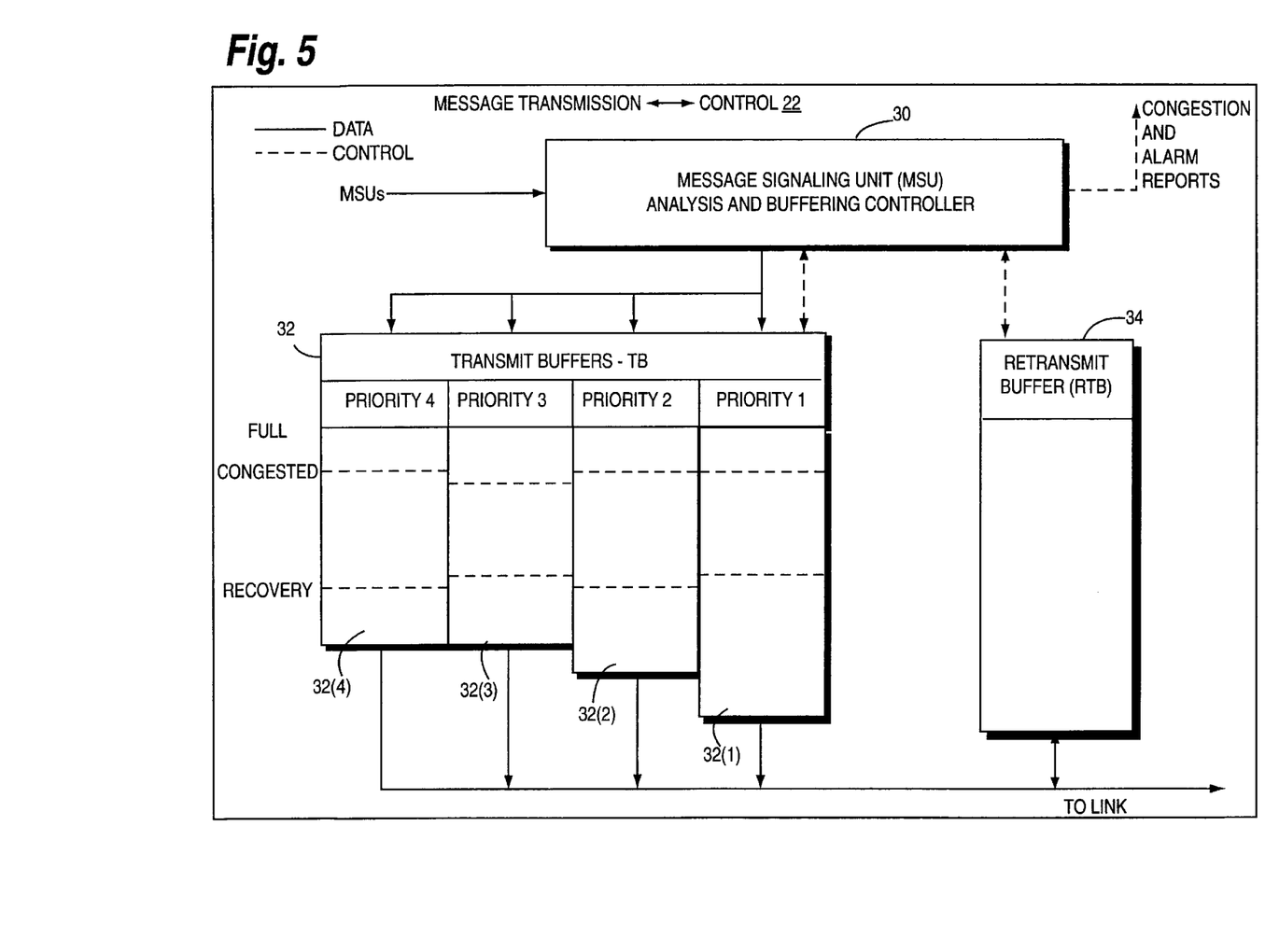
FIG. 5 is a diagram illustrating an example structure of the congestion message buffer shown in FIG. 4 as a doubly-linked list.

The present invention may also be employed in systems where more than one congestion level is employed. For example, FIG. 5 shows four transmit buffers 32 in message transmission control 22 corresponding to four different priorities. In such a configuration, it is desirable to report the congestion status of each of these four priority buffers. As a result, a set of congestion and recovery messages correspond to each of the defined priority levels. While it may be more efficient in some systems to employ a single congestion/recovery message set to one of multiple priority levels, this configuration may prove to be uneconomical in practice.

In addition to the four transmit buffers 32, a retransmit buffer (RTB) 34 is employed to store a copy of each transmitted MSU until an acknowledgment for that specific MSU is received. When an MSU is acknowledged, it is deleted from the retransmit buffer 34, together with any preceding MSUs in the retransmit buffer. On the other hand, if a "not acknowledged" signal is received for an earlier transmitted MSU, the non-acknowledged MSU is retransmitted. A message signaling analysis and buffering controller 30 receives MSUs and determines the priority of each MSU, e.g., by detecting priority bits in an MTP header. Based on the determined priority, controller 30 routes each MSU to a corresponding one of the plural priority transmit buffers 32(1)–32(4).

Each transmit buffer may be a first-in-first-out (FIFO)-type buffer.

Messages are transmitted starting from the highest priority buffer continuing with the next highest priority buffer and so forth in the sequence in which the messages are stored in each of the buffers. Each transmit buffer is configured with three congestion levels: a congested level, a full level, and a recovery level.

Since the retransmit buffer 34 holds only a limited number of messages, a large number of message retransmissions may fill up the retransmit buffer 34. When the retransmit buffer 34 is full, queued messages to be transmitted for the first time begin to back up in the transmit buffers 32. Those queued messages are therefore sorted by priority by the message signaling unit (MSU) analysis and buffer controller 30 and saved in arrival order in the priority transmit buffers 32(1)-32(4). When the number of messages stored in the retransmit buffer 34 or one of the priority transmit buffers 32 reaches its configured congestion level, the MSU analysis and buffering controller 30 sends a congestion report to a higher SS7 protocol level, i.e., MTP-L3 and up, so that those higher SS7 levels stop sending additional messages. The configured congestion level is set to less than the configured full level to permit messages which are already in the "pipeline," i.e., already forwarded from the upper SS7 levels for transmission when the congestion report was generated, to be stored in the buffer space between the congested and full levels. If messages for a particular priority buffer are received after that buffer is full, those additional messages are discarded upon arrival, and an alarm is sent from the MSU analysis and buffering controller 30 to higher levels in the SS7 stack. As messages are successfully transmitted, i.e., acknowledged, additional room is made in one or more of the transmit buffers and in the retransmit buffer. When the number of accumulated messages is reduced to at or below the recovery level, the MSU analysis and buffering controller 30 sends a resume message to the upper protocol levels so that new messages are sent for transmission over the link.

Initially, none of the four transmit buffers 32(1)–32(4) are congested. Thereafter, whenever a priority buffer is reported as congested, all lower priority transmit buffers are assumed to be congested, and all higher priority transmit buffers are not. It is possible, though unlikely, that a higher priority buffer might initially become congested first. When a priority buffer enters a recovered state, all higher priority buffers are assumed to be recovered, and all lower priority buffers are not. Because higher priority messages are typically sent first, the higher priority buffers should be empty before transmission at the next lower priority can begin.

Based on these assumptions, when a congestion alarm of level N arrives, the controller 29 examines the congestion message buffer 28. Any congestion recovery alarms for priority level N or lower priority levels are deleted from congestion message buffer 28, and the congestion alarm is inserted. When a recovery alarm of level N arrives, the controller 29 examines the congestion message buffer 28. Any congestion alarms of priority level N or greater are deleted from congestion message buffer 28, and the recovery alarm is inserted into the congestion message buffer 28.

Although this particular buffer protocol has been shown as an example implementation, other buffer protocols may be used that require other insertion and deletion procedures. Regardless of buffer protocols, the present invention ensures that time-sensitive congestion messages receive priority treatment. Moreover, surging caused by hysteresis in the congestion state reporting process due to delays in transferring and processing congestion state alarms is considerably reduced, especially when the system is already heavily loaded for other reasons. In addition to reduced surging, the amount of information that is stored in the congestion message buffer is kept under control to minimize buffering delay and minimize the possibility of buffer overflow. All of these advantages are achieved without the addition of significant overhead.

Figure 6:
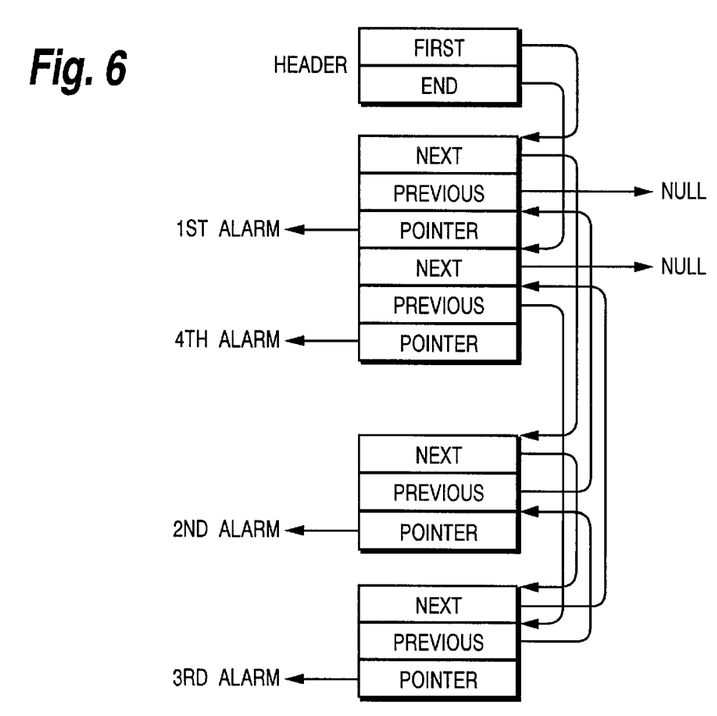
FIG. 6 is a more detailed block diagram illustrating the message control block of FIG. 3.

While the congestion message buffer 28 may be configured in any number of ways, a presently preferred, example configuration uses a linked list type structure. A doubly-linked list structure such as the example shown in FIG. 6 is preferred for the congestion message buffer 28 (although a singly-linked list would work as well). A doubly-linked list is a known technique that permits deletions and insertions to the list without moving elements in the buffer. In this way, when a congestion message is cancelled, the corresponding pointer for that alarm is simply removed from the linked list.

The four messages in FIG. 6 arrive in the numbered order indicated at the left and are inserted into memory in any sequence, the order being preserved by the Next and Previous pointers rather than the physical position in memory. This arrangement permits deletion of messages by reassigning the Next and Previous pointers of the Previous and the Next messages to point where the deleted message's Next and Previous pointers pointed when a message is cancelled. The freed memory containing the message and the pointer node released must be returned to the memory pool. The end pointers, in either direction, may point to Null as shown, or terminate in some other suitable manner such as pointing to the Header.

Figure 7:
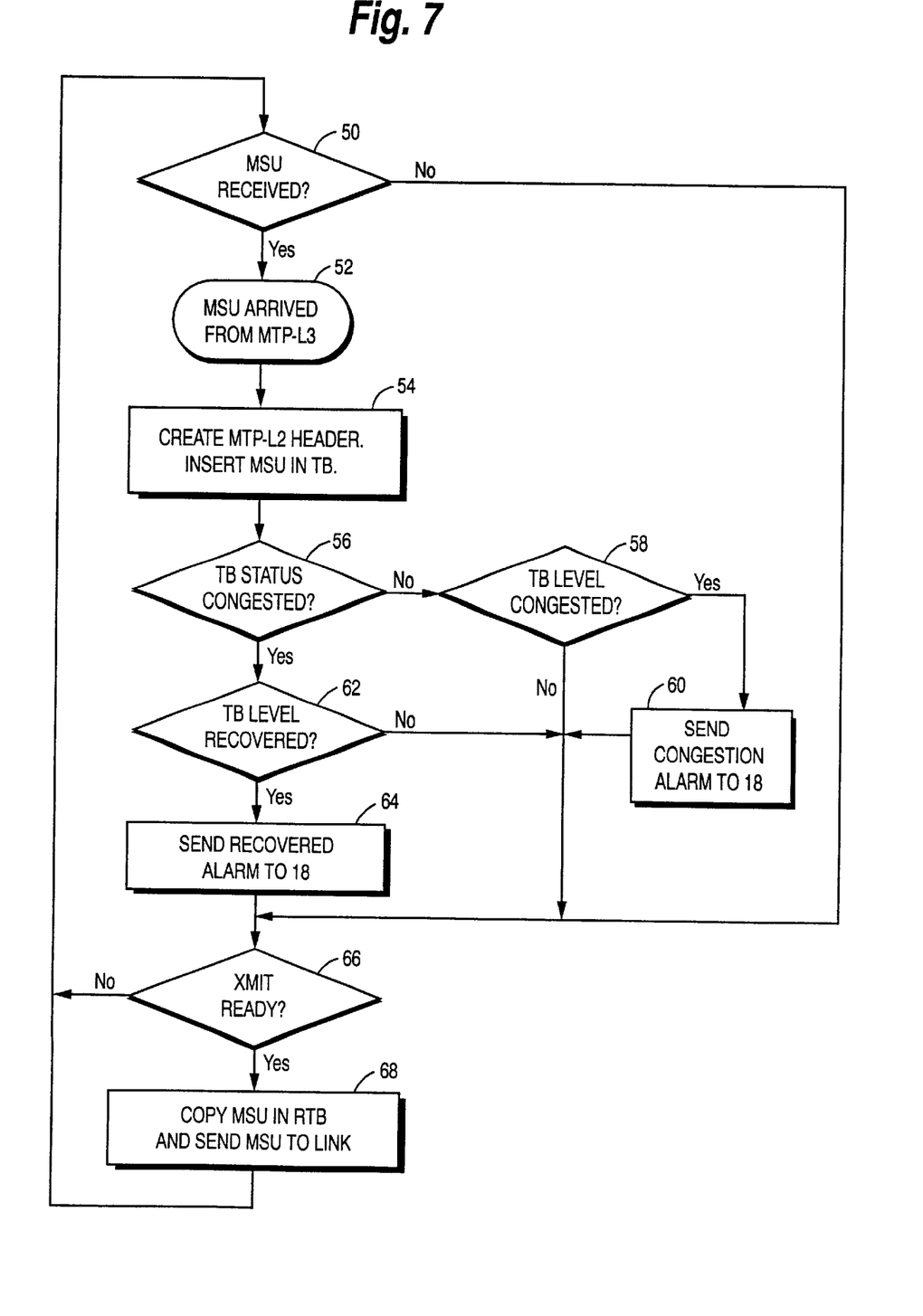
FIG. 7 is a flowchart diagram of a message signaling unit (MSU) transmission and buffering procedure where the congestion status of the transmit buffer(s) is communicated using congestion alarm and congestion recovery messages.
Figure 8:
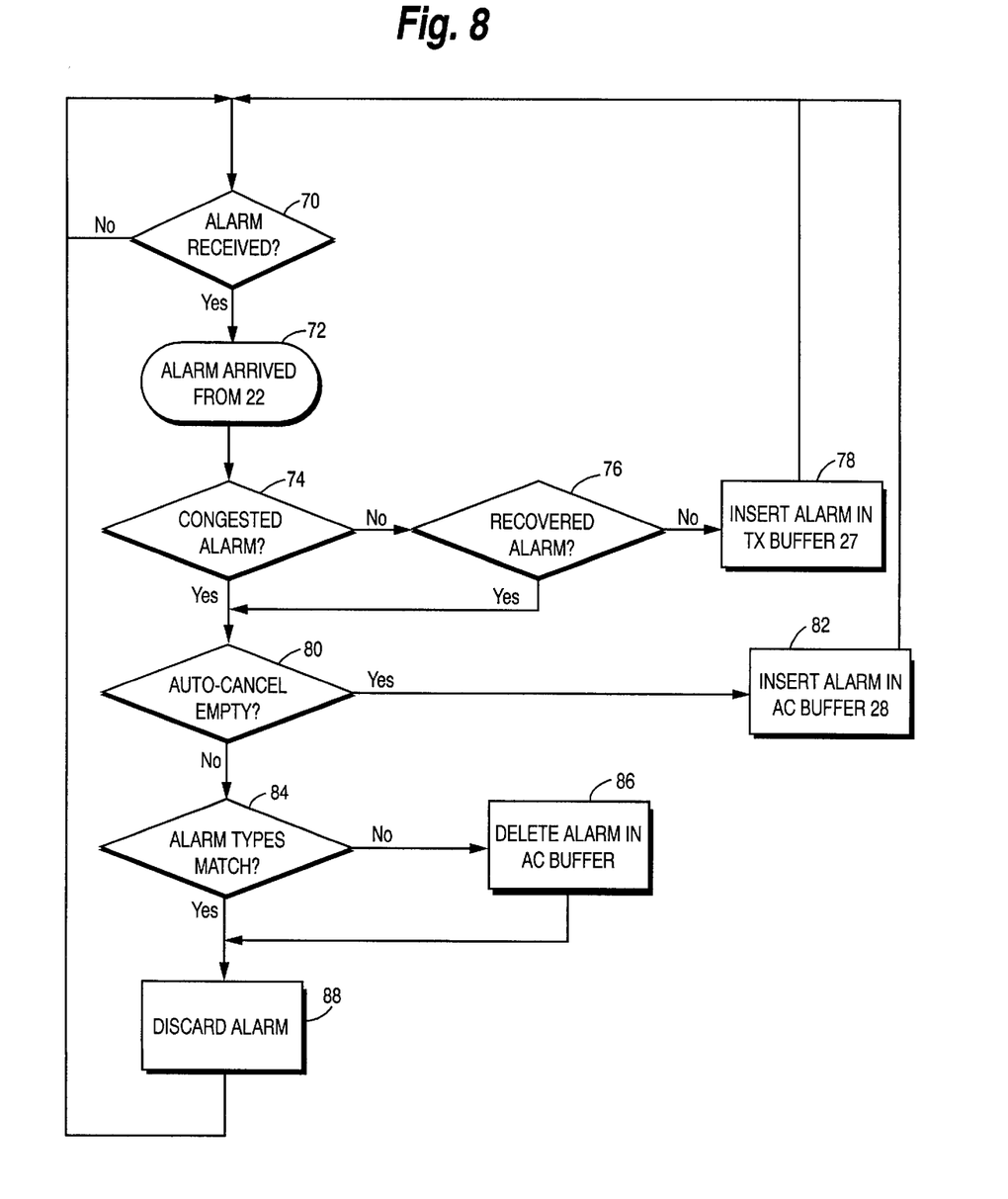
FIG. 8 is a flowchart diagram of a congestion message handling routine in accordance with an example embodiment of the present invention.

The operation of the present invention in the upper layer transmission interface 18 for a single transmit buffer configuration in the message transmission control 22 is now described in conjunction with the flowchart diagrams in FIGS. 7 and 8.

In FIG. 7 at decision block 50, a decision is made whether a message signaling unit (MSU) is received from the upper layer MTP-L3 for transmission over the link between signaling points. If so, the arrival of the MSU from MTP-L3 is noted (block 52), and an MTP-L2 header is attached to the MSU before inserting the MSU in the transmit buffer 32 in message transmission control 22 (block 54). The transmit buffer 32 congestion status is determined in block 56. An example implementation may employ a status flag for the transmit buffer to indicate whether the buffer is congested. Thus, by checking that flag, additional alarms may be avoided at the arrival of each new message. Alternatively, the status parameter may be a number of messages with the number zero corresponding to a not congested status. If the transmit buffer 32 status is not congested, a check is made in block 58 of the transmit buffer level: recovered, congested, fill, etc. If congested, a congestion alarm is forwarded to the upper layer transmission interface 18 via the link reception control 24. Otherwise control proceeds to decision block 66.

If the transmit buffer 32 status is congested in block 56, a decision is made in block 62 whether the transmit buffer 32 level is now recovered. If not, control proceeds to decision block 66. On the other hand, if the transmit buffer 32 level has recovered, a recovery s alarm is forwarded from message transmission control 22 via linked reception control 24 to the upper layer transmission interface 18. Decision block 66 inquires whether the link hardware can accept a message. If not, control loops back to decision block 50 where the procedure repeats. If the link hardware can accept a message, the oldest MSU in the transmit buffer 32 is transmitted over the link via MTP-L1 interface frame driver 26, and a copy of the transmitted MSU is stored in the retransmit buffer (block 68).

In FIG. 8, a decision is made in block 70 whether an alarm message is received in the upper layer transmission interface 18. When such an alarm message is received from the message transmission control 22 (block 72), a decision is made in block 74 whether the alarm is a congestion alarm. If not, a decision is made in block 76 whether the received alarm is a recovery alarm. If not, the alarm is assumed unrelated to congestion and is inserted in the transmit buffer 27 of the upper layer transmission interface 18 and control returns to decision block 70.

On the other hand, if a congestion alarm or a congestion recovery message is received, a decision is made in block 80 whether the auto-cancellation buffer 28 is empty. If so, the received congestion alarm or congestion recovery message is inserted in the auto-cancellation buffer 28 (block 82), and control returns to block 70. If the auto-cancellation buffer 28 is not empty, a decision is made in block 84 whether the type or state of the received alarm matches that stored in the buffer 28. If the alarms are of different types or states, the alarm currently stored in the auto-cancellation buffer 28 is deleted (block 86), and both alarms are discarded. On the other hand, if the alarm types/states match, the recently received alarm is discarded (block 88), and control returns to block 70.

Figure 9:
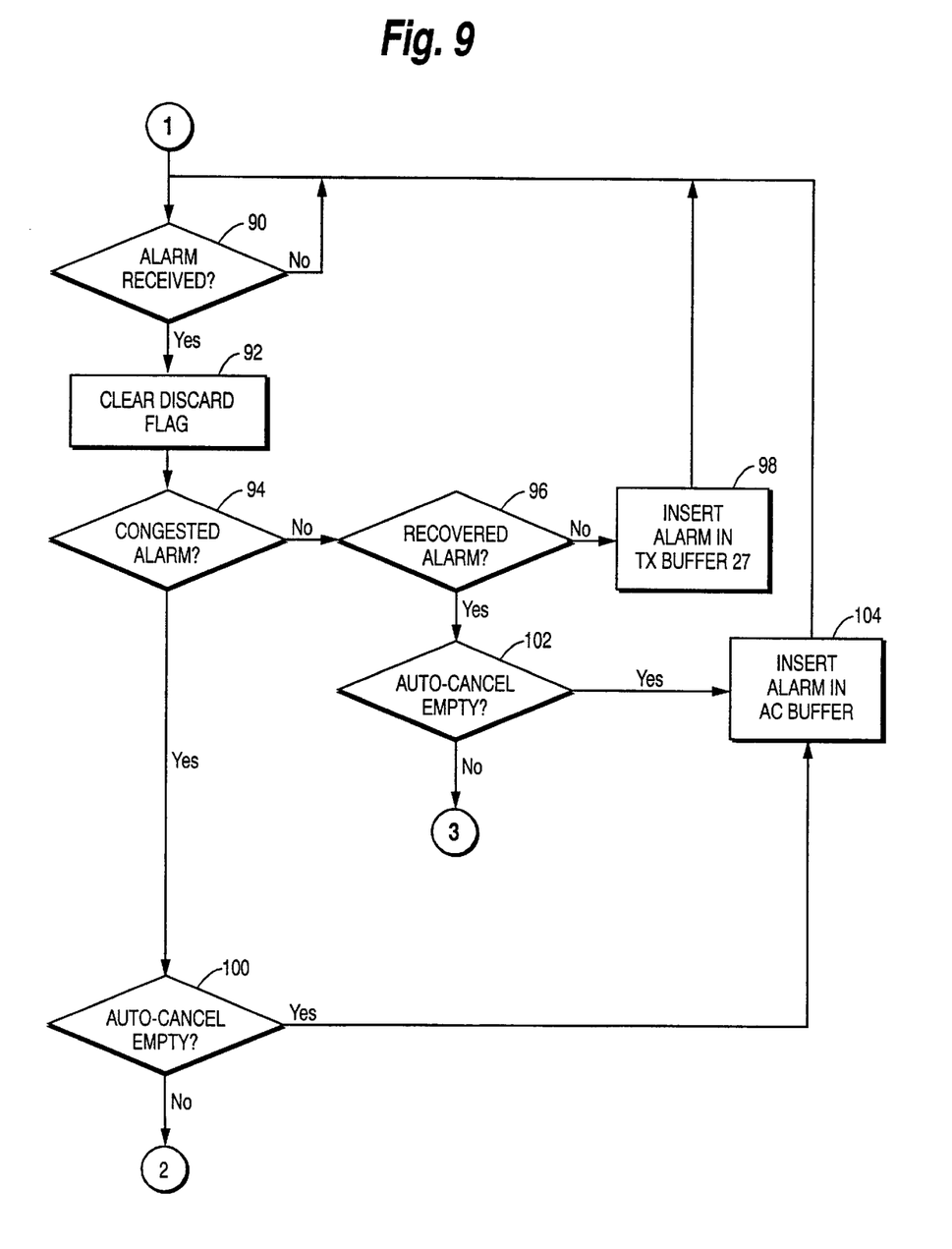
FIGS. 9–11 are flowchart diagrams showing a congestion message handling routine in accordance with another example embodiment of the present invention.
Figure 10:
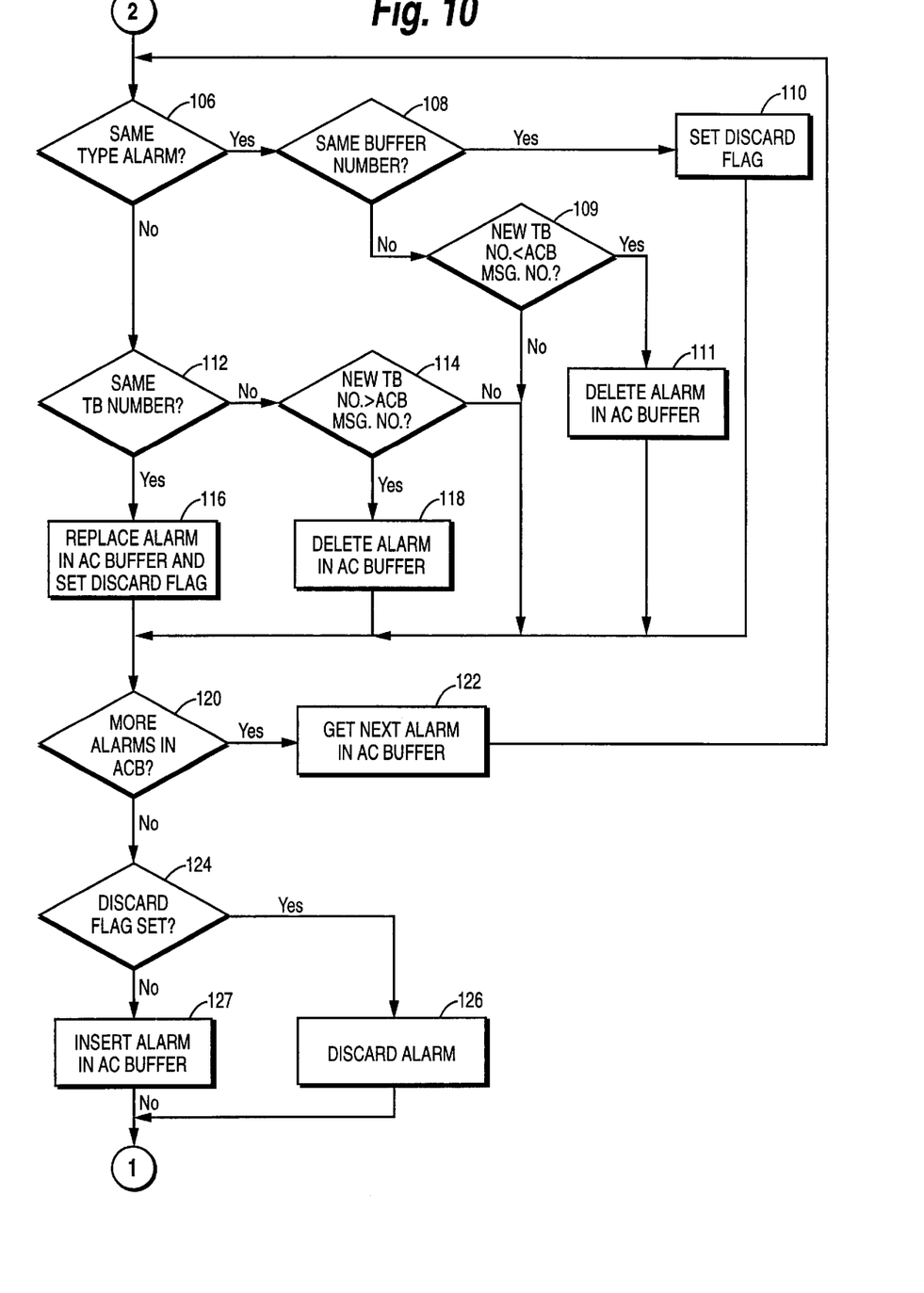
Figure 11:
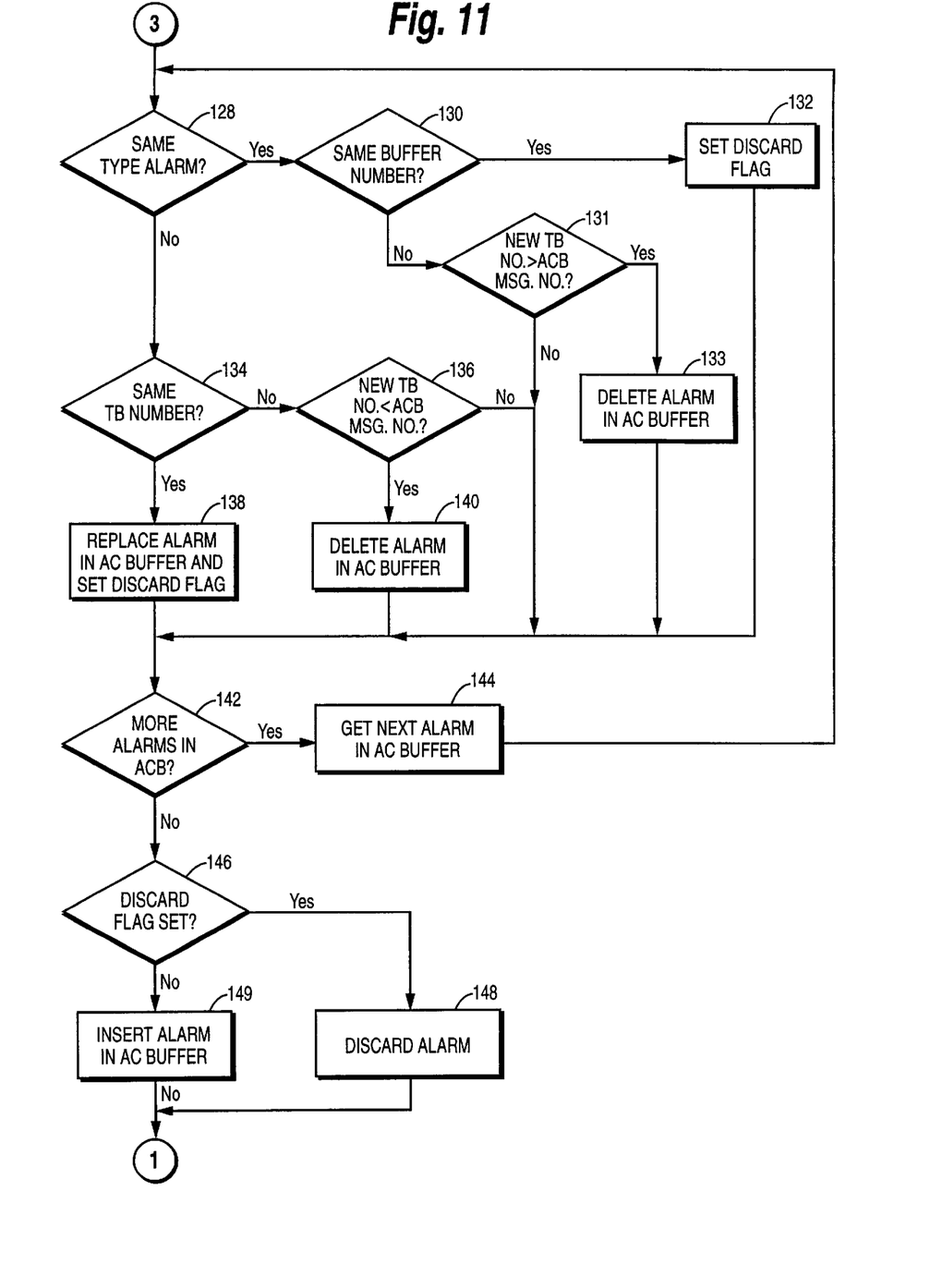

The operation of an example, multiple priority level embodiment of the present invention is now described in conjunction with the flowchart diagrams illustrated in FIGS. 9–11. A decision is made in block 90 whether an alarm is received. When an alarm is received, a discard congestion message flag is cleared (block 92). The "discard congestion message flag" is used in this example implementation because the congestion message is not deleted immediately when first indicated. It may be easier to compare the actual parts of the corresponding (i.e., the new and the buffered) messages than it is to copy values to special variables and then compare. This flag is therefore a reminder to throw away the message when it should be discarded.

A decision is made in block 94 if the alarm is a congestion alarm. If not, a decision is made in block 96 if the alarm is a congestion recovery alarm. If not, the alarm is assumed to be other than a congestion related message and is inserted in the transmit buffer 27 of the upper layer of transmission interface 18 (block 98), and control returns to block 90. If the alarm is a congestion alarm, a decision is made whether the auto-cancellation buffer 28 is empty. If not, control proceeds via flag "2" to the procedures shown in FIG. 10 and described below. However, if the auto-cancellation buffer 28 is empty, the congestion alarm is inserted in the buffer 28 (block 104), and control returns to decision block 90. Similarly, if the alarm is a recovery alarm and the decision in block 102 reveals that the auto-cancellation buffer 28 is empty, the congestion recovery alarm is inserted in buffer 28 with control returning to block 90. However, if the auto-cancellation buffer 28 is not empty, control proceeds via flag 3 to the procedures shown in FIG. 11 and described below.

Control continues in FIG. 10 when it is determined that the auto-cancellation buffer 28 is not empty in block 100 of FIG. 9. A decision is made in block 106 whether the received alarm is of the same state/type as that of the alarm stored in the congestion message buffer 28. If so, a decision is made in block 108 whether the alarm comes from the same priority transmit buffer 32(1)–32(4) which represents a particular priority level. If so, the discard flag is set in block 110, and control proceeds to decision block 120. If the compared alarms have different priority levels, then a decision is made in block 109 whether the transmit buffer priority level number associated with the new alarm is less than the transmit buffer priority level number of the congestion alarm stored in the congestion message buffer 28. If so, the stored congestion alarm is deleted from buffer 28 (block 111). If not, control proceeds directly to block 120.

If the compared alarms are of different types or states, a decision is made in block 112 whether the compared messages have the same priority level relating to the same transmit buffer. If not, a test is made in block 114 whether the new congested message is from a higher transmit buffer (priority) number so that the lower priority congested message can be discarded. This follows the assumption that lower-level (lower priority) buffers are congested. For example, if a transmit buffer level 3 is congested, messages from lower level transmit buffers cannot be sent. Therefore, it is unnecessary to check them for congestion. Messages to the currently highest congested transmit buffer and any lower levels are halted, and any congestion message from transmit buffer level 2 is cancelled. When the transmit buffer level 3 recovers, the message transmission control 22 checks the next lower level buffer status (if there is a next lower) and sends a proper congested or recovered message. Returning to the flow diagram, if the alarms are of different types for the same priority level, the alarm currently stored in the auto-cancellation buffer 28 is replaced with the most recent alarm (block 116) and set the discard flag.

A decision is made in block 120 if there are any more alarms stored in the auto-cancellation buffer 28. If so, the next alarm stored in the auto-cancellation buffer 28 is retrieved (block 122), and the procedure repeats beginning at block 106. Otherwise, control proceeds to decision block 124 to determine whether the discard flag is set. If it is, then the recently received alarm is discarded (block 126), control returns via flag 1 to block 90. If it is not, the message is inserted into the auto-cancellation buffer (block 127) and control returns via flag 1 to block 90.

If the alarm is a congestion recovery alarm and the auto-cancellation buffer 28 is not empty, the procedures illustrated in FIG. 11 are followed. A decision is made in block 128 if the congestion recovery alarm is of the same type or state as the alarm currently stored in the automatic cancellation buffer 28. If so, a decision is made in block 130 whether the alarm comes from the same priority transmit buffer 32(1)-32(4) which represents a particular priority level. If so, the discard flag is set in block 132 and control proceeds to decision block 142. If the compared alarms have different priority levels, a decision is made in block 131 whether the transmit buffer priority level number associated with the new alarm is greater than the transmit buffer priority level number of the congestion alarm stored in the congestion message buffer 28. If so, the stored congestion alarm is deleted from the buffer 28 (block 133). If not, then control proceeds directly to block 142.

If the compared alarms are of different types or states, a decision is made in block 134 whether the compared messages have the same priority level relating to the same transmit buffer. If not, a test is made in block 136 similar to that made in block 114. In the case of recovery messages, where congested messages can be cancelled, any old recovery messages of higher level (priority) still in the congestion message buffer 28, can be deleted. Because of the cancellations, the upper level MTP-L3 may receive a congested level 3 message which then may be interpreted to mean that no messages up to level 3 should be sent to MTP-L2. The next indication may be a recovery message for level one, which is interpreted by MTP-L3 as permitting new messages for transmit priority levels one, two, or three. Such "jumps" usually only happen when the system is very heavily loaded. Normally, these messages will all be delivered with no cancelled or discarded congestion/recovery messages so transitions will usually be to the next buffer number only. If the alarms are of different types for the same priority level, the alarm currently stored in the auto-cancellation buffer 28 is replaced with the most recent alarm (block 138) and the discard flag is set A decision is made in block 142 if there are any more alarms stored in the auto-cancellation buffer 28. If so, the next alarm stored in the auto-cancellation buffer 28 is retrieved (block 144), and the procedure repeats beginning at block 106. Otherwise, control proceeds to decision block 146 to determine whether the discard flag is set. If it is, then the recently received alarm is discarded (block 148), control returns via flag 1 to block 90. If it is not, the message is inserted into the auto-cancellation buffer (block 149) and control returns via flag 1 to block 90.

The foregoing description shows only one preferred, example embodiment of the present invention. Various modifications are apparent to those skilled in the art without departing from the scope of the present invention defined only by the appended claims. Therefore, the embodiment shown and described is only illustrative, not restrictive.

What is claimed is:

1. A method for managing control messages, comprising the steps of:
    storing a control message in a buffer;
    receiving a current control message indicating a first state;
    comparing the current control message with the buffered control message; and
    if the buffered control message is in a second state different from the first state, removing the buffered control message from the buffer,
    wherein the control message in the first state is one of a congestion alarm and a congestion recovery alarm and in the second state is the other of the congestion alarm and the congestion recovery alarm.

2. The method in claim 1, further comprising:
    discarding the buffered control message and the current control message.

3. The method in claim 1, further comprising:
    if the states of the buffered and current control message match, discarding one of the control messages and storing the other in the buffer.

4. The method in claim 1, further comprising:
    generating control messages for different control levels;
    storing a corresponding control message in the buffer for each control level;
    determining a control level of the current control message; and
    removing a buffered control message from the buffer having the same level as the current control message when a state of that buffered control message having the same level and a state of the current control message are different.

5. The method in claim 4, further comprising:
    removing another buffered control message from the buffer at a control level other than the same level when the buffered control message having the same level as the current control message is removed.

6. The method in claim 5, wherein the another buffered control message is at a higher control level other than the same level.

7. The method in claim 5, wherein the another buffered control message is at a lower control level than the same level.

8. A method for use in a communications system, comprising:
    receiving one or more congestion alarm messages,
    receiving one or more congestion recovery messages;
    storing one of the congestion alarm and congestion recovery messages in a buffer;
    automatically canceling the buffered message when the other of the congestion alarm and congestion recovery messages is received; and
    discarding the buffered message and the canceled message.

9. The method in claim 8, further comprising:
    when a new congestion recovery message is received, storing the new congestion recovery message in the buffer and discarding a congestion alarm message stored in the buffer, and
    when a new congestion alarm message is received, storing the new congestion alarm message in the buffer and discarding a congestion recovery message stored in the buffer.

10. The method in claim 8, wherein congestion alarm messages and congestion recovery messages are assigned to different priority levels.

11. The method in claim 10, wherein when the buffer stores a congestion alarm message for one of the priority levels, lower priority levels are assumed to be congested and higher priority levels are assumed to be not congested such that when a congestion recovery message is received corresponding to the one priority level, congestion alarm messages stored for the one priority level and higher are canceled.

12. The method in claim 11, wherein the received congestion recovery message is stored in the buffer.

13. The method in claim 10, wherein when the buffer stores a congestion recovery message for one of the priority levels, lower level priorities are assumed to be congested and higher priority levels are assumed to be not congested such that when a congestion alarm message is received corresponding to the one priority level, congestion recovery messages stored for the one priority level and lower are canceled.

14. The method in claim 13, wherein the received congestion alarm message is stored in the buffer.

15. A data transmission interface, comprising:
    a buffer storing control messages having a first state and a second state, and
    a controller managing control messages received for storage in the buffer,
    wherein the controller cancels one of the control messages stored in the buffer having the first state when a subsequent control message in the second state is received.

16. The data transmission interface according to claim 15, wherein the buffer stores time sensitive information, the data transmission interface further comprising:
    a first-in-first-out (FIFO) buffer, in addition to the control message buffer, storing messages containing information other than the time sensitive information.

17. The data transmission interface in claim 15, wherein the controller discards the subsequent control message if the states of the one and the subsequent control messages match.

18. The data transmission interface in claim 15, wherein the control message in the first state is a congestion alarm and in the second state is a congestion recovery alarm.

19. The data transmission interface in claim 15, wherein the control message in the first state is a congestion recovery alarm and in the second state is a congestion alarm.

20. The data transmission interface in claim 15, wherein control messages are generated for different control levels with corresponding control messages being stored in the buffer for each control level in a linked list structure.

21. The data transmission interface in claim 20, wherein the controller determines a control level of the subsequent control message, and removes a buffered control message having the same level as the current control message from the linked list when the state of the buffered control message having the same level and the subsequent control messages are different.

22. Apparatus comprising:
    plural transmit buffers, each transmit buffer having a corresponding priority level and storing messages with the corresponding priority level to be transmitted over a transmission link, where congestion control messages relating to a congestion status of each transmit buffer are generated for each transmit buffer;

a congestion message buffer storing congestion messages relating to each transmit buffer; and a controller determining the priority level and state of a newly-generated congestion message, and if the determined state of the newly-generated congestion message is different than the state of a congestion message at the determined level already stored in the congestion message buffer, the controller cancels the already stored congestion message.

23. The apparatus in claim 22, wherein the controller discards both the newly-generated and the already stored congestion messages having different states.

24. The apparatus in claim 22, wherein the controller assigns a congestion alarm message and a congestion recovery message to different priority levels.

25. The apparatus in claim 24, wherein when the congestion message buffer stores a congestion alarm message for one of the priority levels, lower priority levels are assumed to be congested and higher priority levels are assumed to be not congested such that when a congestion recovery message is received corresponding to the one priority level, the controller cancels congestion alarm messages stored for the one priority level and higher.

26. The apparatus in claim 25, wherein the controller stores the received congestion recovery message in the congestion message buffer.

27. The apparatus in claim 24, wherein when the congestion message buffer stores a congestion recovery message for one of the priority levels, lower level priorities are assumed to be congested and higher priority levels are assumed to be not congested such that when a congestion alarm message is received corresponding to the one priority level, the controller cancels congestion recovery messages stored for the one priority level and lower.

28. The apparatus in claim 27, wherein the controller stores the received congestion alarm message in the congestion message buffer.

29. The apparatus in claim 22, further comprising:

a first-in-first-out (FIFO) buffer for storing messages from the controller other than congestion messages.

30. A data transmission interface, comprising:

a first buffer storing first control messages of a first type including time sensitive congestion alarm and recovery messages;

a second buffer storing second control messages of a second type different than the first type control messages; and a controller analyzing received control messages and selectively storing the first type control messages in the first buffer and the second type control messages in the second buffer, wherein the controller does not store redundant, first type control messages in the first buffer.

31. The data transmission interface according to claim 30, wherein the first type corresponds to a first priority and the second type corresponds to a second priority lower than the first priority and the controller selectively transmits control messages stored in the first buffer before transmitting control messages in the second buffer.

32. The data transmission interface according to claim 30, wherein the first control messages are time sensitive congestion alarm and recovery messages.

33. The data transmission interface according to claim 32, wherein the controller cancels a congestion alarm message before transmission from the first buffer after receiving a recovery message and cancels a recovery message before transmission from the first buffer after receiving a congestion alarm message.

* * * * *